United States Patent
Stenfort et al.

(10) Patent No.: US 8,499,308 B2
(45) Date of Patent: Jul. 30, 2013

(54) INITIATOR NOTIFICATION METHOD AND APPARATUS

(75) Inventors: Ross John Stenfort, San Jose, CA (US); Anthony Frank Aiello, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 1365 days.

(21) Appl. No.: 11/690,090

(22) Filed: Mar. 22, 2007

(65) Prior Publication Data

US 2008/0155562 A1 Jun. 26, 2008

Related U.S. Application Data

(63) Continuation-in-part of application No. 11/644,549, filed on Dec. 22, 2006, now Pat. No. 7,761,642.

(51) Int. Cl.
*G06F 3/00* (2006.01)
*G06F 13/12* (2006.01)

(52) U.S. Cl.
USPC ............................. 719/318; 719/326; 710/74

(58) Field of Classification Search
None
See application file for complete search history.

(56) References Cited

U.S. PATENT DOCUMENTS

| | | | |
|---|---|---|---|
| 5,440,752 A | 8/1995 | Lentz et al. | |
| 6,247,100 B1 | 6/2001 | Drehmel et al. | |
| 6,388,590 B1 | 5/2002 | Ng | |
| 6,735,650 B1 | 5/2004 | Rothberg | |
| 7,418,615 B2 * | 8/2008 | Chang et al. | 719/318 |
| 7,478,177 B2 * | 1/2009 | Cherian et al. | 710/74 |
| 7,519,870 B1 * | 4/2009 | Sim-Tang | 719/318 |
| 7,721,021 B2 * | 5/2010 | Johnson | 710/74 |
| 2003/0033465 A1 | 2/2003 | Chien | |
| 2003/0131166 A1 | 7/2003 | Utsunomiya et al. | |
| 2003/0236953 A1 | 12/2003 | Grieff et al. | |
| 2004/0003131 A1 * | 1/2004 | Curtis | 719/318 |
| 2004/0054866 A1 * | 3/2004 | Blumenau et al. | 711/202 |
| 2005/0010686 A1 * | 1/2005 | Nishida et al. | 709/238 |
| 2005/0120150 A1 | 6/2005 | Lissel et al. | |
| 2005/0186832 A1 * | 8/2005 | Nemazie | 439/378 |
| 2005/0198425 A1 | 9/2005 | Wang et al. | |
| 2005/0268149 A1 * | 12/2005 | Sherlock | 714/2 |
| 2006/0031612 A1 | 2/2006 | Bashford et al. | |
| 2006/0101171 A1 * | 5/2006 | Grieff et al. | 710/36 |

(Continued)

FOREIGN PATENT DOCUMENTS

TW 507896 10/2002

OTHER PUBLICATIONS

"Multi-Ported PCI to PCI bridge chip", Kay Annamalai, 1997, pp. 1-8.*

(Continued)

*Primary Examiner* — Tuan Dao
(74) *Attorney, Agent, or Firm* — Maryam Imam; IPxLAW Group LLP

(57) ABSTRACT

In one embodiment of the present invention, a memory system is disclosed to include at least one initiator, a SATA device, and an improved bridge device configured to facilitate communication between the at least one initiator and the SATA device and having at least one input port and operative to receive information through the input port(s) from the initiators, the improved bridge device for processing a notification event wherein notification is sent to the at least one initiators during a notification event, and for performing an action, based on a an event, thereby facilitating ease of communication between the initiator and the SATA device.

37 Claims, 16 Drawing Sheets

U.S. PATENT DOCUMENTS

| | | | |
|---|---|---|---|
| 2006/0106949 A1* | 5/2006 | Nicolson et al. | 710/5 |
| 2006/0136666 A1 | 6/2006 | Pang et al. | |
| 2006/0174049 A1 | 8/2006 | Lin et al. | |
| 2006/0271739 A1 | 11/2006 | Tsai et al. | |
| 2007/0073968 A1* | 3/2007 | Gasser et al. | 711/114 |
| 2007/0226757 A1* | 9/2007 | Bashford et al. | 719/326 |
| 2008/0010530 A1* | 1/2008 | Davies et al. | 714/31 |

OTHER PUBLICATIONS

"Design, Implementation and Evaluation of Security in iSCSI-based Network Storage Systems", Shiva Chaitanya, 2006, pp. 1-12.*

"Design of a Giga-bit Hardware Accelerator for the iSCSI Initiator", Chung-Ho Chen, 2006, pp. 1-7.*

"Serial Attached SCSI General overview", Rob Elliott, 2003, pp. 1-88.*

Klaus-Peter Deyring, Serial ATA: High Speed Serialized AT Attachment, Serial ATA Workgroup, Jan. 7, 2003, pp. 1-35, Santa Cruz, USA, XP002393220.

Robert C. Elliot, Working Draft American National Standard: Information Technology Serial Attached SCSI—1.1 (SAS-1.1), Project T10/1601-D; Rev. 9e Jul. 24, 2005, Houston, TX, USA; Reference No. ISO/IEC 14776-151:200x.

Robert C. Elliot, Working Draft American National Standard: Information Technology Serial Attached SCSI—2 (SAS-2), Project T10/1760-D; Rev. 6 Sep. 22, 2006, Houston, TX, USA, Reference No. ISO/IEC 14776-152:200x.

SATA IO Board Members: Dell Computer Corporation, Hewlett Packard Corporation, Hitachi Packard Corporation, Hitachi Global Storage Technologies, Inc., Intel Corporation, Maxtor Corporation, Seagate Technology, Vitesse Semiconductor Corporation, Serial ATA International Organization: Serial ATA Revision 2.5, Oct. 27, 2005.

* cited by examiner

16

52

| INITIATOR | PORT | NOTIFICATION |
|---|---|---|
| 54<br>0 | 0 | 1 |
| 56<br>0 | 1 | 1 |
| 58<br>1 | 0 | 1 |
| 60<br>1 | 1 | 1 |

FIG. 3

| BYTE/BIT | 7 | 6 | 5 | 4 | 3 | 2 | 1 | 0 |
|---|---|---|---|---|---|---|---|---|
| 0 | FIS TYPE (A1h) | | | | | | | |
| 1 | N | I | R | R | R | PM PORT | | |
| 2 | R | STATUS HI | | | R | STATUS LO | | |
| 3 | ERROR | | | | | | | |
| 7:4 | RESERVED | | | | | | | |

FIG. 16

INITIATOR NOTIFICATION METHOD AND APPARATUS

CROSS REFERENCE TO RELATED APPLICATION

This application is a continuation-in-part of my previously-filed U.S. patent application Ser. No. 11/644,549, filed on Dec. 22, 2006, now U.S. Pat. No. 7,761,642 and entitled "Serial Advanced Technology Attachment (SATA) And Serial Attached Small Computer System Interface (SCSI) (SAS) Bridging" (hereinafter referred to as the "SATA Patent Document", the disclosure of which is incorporated herein as though set forth in full.

FIELD OF THE INVENTION

The present invention relates generally to systems using initiators and targets in a Serial Advanced Technology Attachment ATA (SATA) and/or Serial Attached Small Computer System Interface (SCSI) (SAS) environments, and in particular to a target causing two or more initiators to communicate and/or share information with one another without a direct connection therebetween.

BACKGROUND OF THE INVENTION

Overview of SATA Protocol

A "device" as used herein refers to a peripheral adhering to any known standard adopted by the industry. SATA is a high-speed serial link replacement for the parallel Advanced Technology Attachment (ATA) attachment of mass storage devices. The serial link employed is a point-to-point high-speed differential link that utilizes gigabit technology and 8b/10b encoding known to those of ordinary skill in the art. The SATA protocol is based on a layered communication model similar to Open Systems Interconnection (OSI) Reference Model. An overview is presented below. For more detail, the reader is referred to the SATA standard document incorporated herein by reference. The SATA specification is provided in the publication entitled "Serial ATA: High Speed Serialized ATA Attachment" or "Serial ATA International Organization: Serial ATA Revisions 2.5, dated Oct. 27, 2005, both of which are currently available at Serial ATA work group web site www.serialata.org.

In the SATA protocol, each layer of protocol communicates with its counterpart directly or indirectly. The serial ATA link is defined by a protocol pursuant to a known standard, having four layers of communications, the physical layer for performing communication at a physical level, a link layer, a transport layer and an application layer or sometimes referred thereto as a command layer. A transmitter and a receiver, cannot directly communicate the latter with each other, rather, they must go through the other layers of their system prior to reaching a corresponding layer of the other. For example, for the physical layer of a transmitter to communicate with the transport layer of the receiver, it must first go through the link, transport and application layers of the transmitter and then through the serial ATA link to the application layer of the receiver and finally to the transport layer of the receiver.

The basic unit of communication or exchange is a frame. A frame comprises of a start of frame (SOF) primitive, a frame information structure (FIS), a Cyclic Redundancy Checksum (CRC) calculated over the contents of the FIS and an end of frame (EOF) primitive. The serial ATA organization has defined a specification in which the definition of a frame is provided and which is intended to be used throughout this document. Primitives are double word (Dword) entities where one byte contains a K character that are used to control and provide status of the serial line. The serial ATA organization has defined a specification in which the definition of allowed Primitives is provided and which is intended to be used throughout this document in addition to the SAS defined primitives.

FIG. 1 shows an example of a frame 30. The frame, in FIG. 1, starts with an SOF primitive 30a, followed by a first FIS content 30b, followed by a HOLD primitive 30c indicating that the transmitter does not have data available, followed by a second FIS content 30d, followed by a HOLDA primitive 30e sent to acknowledge receipt of HOLD primitive, sent by the receiver, indicating that the receiver buffer is in a 'not ready' condition, followed by a CRC 30f and an EOF primitive 30g.

The frame 30, in FIG. 1, includes two primitives a HOLD and a HOLDA primitive used for flow control. A HOLD primitive indicates inability to send or to receive FIS contents. A HOLDA primitive is sent to acknowledge receipt of a HOLD primitive. For example, when a receiving node detects that its buffer is almost full, it will send a HOLD primitive to a transmitting node, requesting the transmitter node to stop and when the buffer is ready to receive more data, the receiving node will stop sending a HOLD primitive. The transmitting node sends a HOLDA primitive to acknowledge receipt of the HOLD primitive. Until receipt of the HOLDA primitive, the receiving node continues receiving data. In order to prevent a buffer overrun, the SATA protocol requires a maximum delay of 20 Dwords between a node sending the HOLD primitive and receiving a HOLDA primitive.

There are a number of different frame types. For example, to send data via Direct Memory Access (DMA), a frame known as DMA setup FIS is utilized followed by a DMA data FIS. There are generally three types of FIS structures, one for commands, one for setting up a transfer and another for data relating to the transfer. Each frame structure is used for a different purpose. A command type of frame is sent to execute a command, a setup frame is used to prepare for the data transfer phase of the command and a data frame is used to transfer data.

There is a need for a switch coupled between a plurality of host units and a device for arbitrating communication there between, the switch having associated therewith a delay of time, wherein despite the delay of the switch, the timing requirements of the SATA protocol are met.

Using SAS as a link, three different types of communication protocols may be employed to open a connection. They are Serial ATA Tunneled Protocol (STP), SSP and SMP. STP is used to allow SATA communication methods which are defined in the SATA standard, SSP and SMP are used in SAS communication methods, which is defined in the SAS standards. SSP is used to define communication methods that are used in Small Computer System Interface (SCSI) types of communication.

Once an STP connection is established, also referred to as 'opened', the SATA protocol is generally followed. Once an SMP connection is established or 'opened', an SMP protocol is followed. More specifically, a connection is opened and a connection is established, a request frame is sent by an initiator, a response frame is sent by a target and the connection is closed. The foregoing communication technique and further information regarding SAS is found in the SAS standard, a copy of which is located by referring the web site: www.t10.org. An SMP request from the initiator includes a function code within which an area is reserved, as a vendor unique area, to be used to further define a function to be performed by, for example, a target, such as a unit or device capable of receiving commands.

An "initiator", as used herein, refers to a unit or device that sends commands and is capable of receiving responses to sent commands.

Currently, there is no known efficient ways of maintaining SAS or SATA communication links without dropping them or disallowing communication through the links when an error occurs involving an initiator and a SATA and/or a STP target. There is furthermore, no flexible and informative ways of maintaining links while resetting a device, such as a SATA drive. That is, for example, information regarding the cause of the error may be lost due to a race condition between initiators when the drive is reset. Furthermore, errors, not related to the drive, remain unknown to the initiators because the initiators do not have a way of retrieving information regarding the same. Thus, when an error occurs, the commands of initiators other than that which may have caused the error or related somehow to the error, are wiped out or lost.

Thus, one of the problems currently faced by the foregoing system is lack of information regarding the type of error for the initiators to use in gaining a better understanding of the status of the system. Stated differently, currently, because the initiators remain ignorant of information regarding the error, there can be no system improvement realized. As an example, it is worthy for an initiator to know whether the error was caused by the drive or otherwise. Examples of errors not caused by the drive, in addition to that mentioned above, are problems with an internal component residing in a location in the system that is other than that of the drive. More specifically, in the event of a parity error in a buffer of the device, there is currently no known way of retrieving such a type of error.

When an initiator sends a 'soft' reset to a SATA drive, it will reset (or clear) the pending commands intended for another initiator, thus, the latter is unaware of the clearing or loss of its pending commands, as well as pending commands on the SATA drive, and remains ignorant of its pending commands being cleared on the drive, which creates chaos. Furthermore, the latter remains ignorant of when the reset has been removed. This causes the latter initiator to remain unaware of when to send its commands to the drive or the status of its pending commands.

Another example is the inability to know the location of the error. For example, the error may have been caused in a link between an initiator and an expander and/or the drive and the device.

The SATA drive remains ignorant of the presence of multiple initiators, in fact, all that the drive knows is to receive commands and send responses thereto. Moreover, the initiators remain ignorant of the presence of the other initiators.

There is therefore currently no practical way to communicate errors between the initiators and no practical known way for the initiators to communicate amongst each other through the device or SATA drive. Moreover, the initiators cannot fetch error information from the SATA drive without colliding with one another. In prior art systems, much work is performed by initiators to avoid collisions thereby reducing system bandwidth and performance.

When an error occurs, the initiators are left in the dark regarding the type of error that has occurred with respect to other initiators. To this end, the initiators do not even realize that there has been an error when the error is not theirs; they are simply deprived of using their link to communicate until the drive is successfully reset and the initiators are once again allowed to access the drive.

Currently, when an error occurs, the initiator that is aware of the error sends information to cause all of the links to the drive to be dropped or disconnected so as to avoid any further commands from being sent to the drive because the commands will likely be lost, if sent. The dropping of a link will cause all the initiators to be aware of a topology change. Thereafter, all initiators must query the system to gather information regarding the new topology. This clearly results in chaos as well as adverse affects on performance because rather than performing input/output functions, which is the substance of the initiators tasks, the initiators perform querying to discover the topology of the system. Performance is therefore degraded and chaos is created. Stated differently, querying consumes bandwidth that can be expended on input/output functions and therefore results in reduced system performance.

Yet another problem with current systems is the lack of communication between initiators regarding various information other than errors, i.e. status information. For example, one initiator may wish for other initiators to know that the former will drop out of the system in the near future. Other non-error related information may include the length of time that an initiator has been operational and so forth. There is furthermore no way for an initiator to retrieve error or non-error related information not associated with the drive.

In light of the foregoing, the need arises for a communication system (or bridge) using initiators and links for causing communication between the initiators and between the initiators and a target, such as a SATA drive, such communication including but not limited to information regarding errors.

SUMMARY OF THE INVENTION

Briefly, an embodiment of the present invention includes a memory system including at least one initiator, a SATA device, and an improved bridge device configured to facilitate communication between the at least one initiator and the SATA device and having at least one input port and operative to receive information through the input ports from the initiators, the bridge device for processing a notification event wherein notification is sent to the at least one initiators during a notification event, and for performing an action, based on a an event, thereby facilitating ease of communication.

IN THE DRAWINGS

FIG. 1 shows prior art SATA protocol communication layers.

FIG. 2 shows a memory system 10 to include a group of initiators 12, I0 and I1, coupled to a group of expanders 14, E0 and E1, with the group of expanders being in communication with the multi-port bridge device 16, in accordance with an embodiment of the present invention.

FIG. 3 shows a notification flag table 52, in accordance with an embodiment of the present invention.

Figure 6:
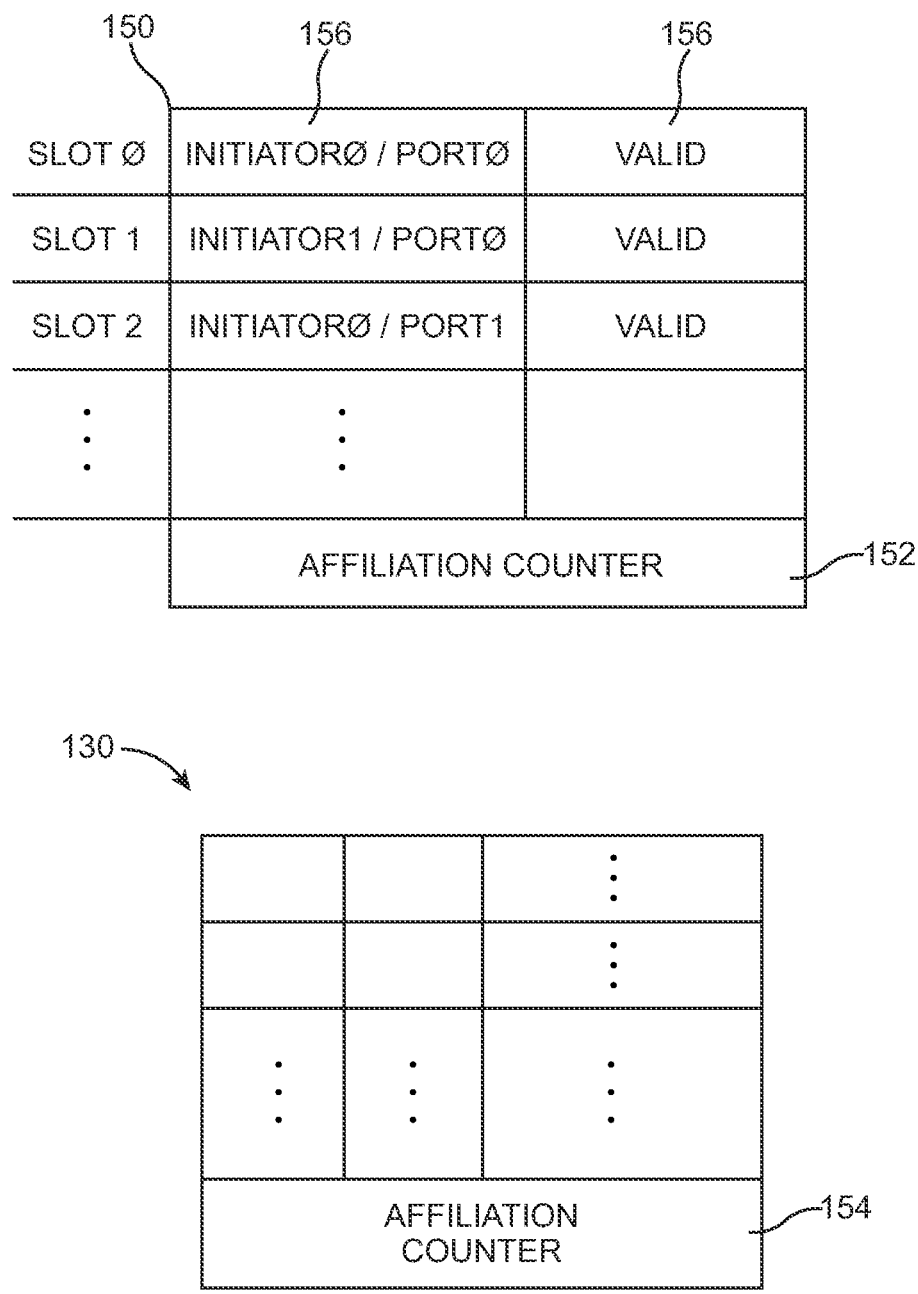

FIG. 6 shows an affiliation table 150 and a mailbox table 130 stored within the device 16 in accordance with another embodiment of the present invention.

Figure 7:
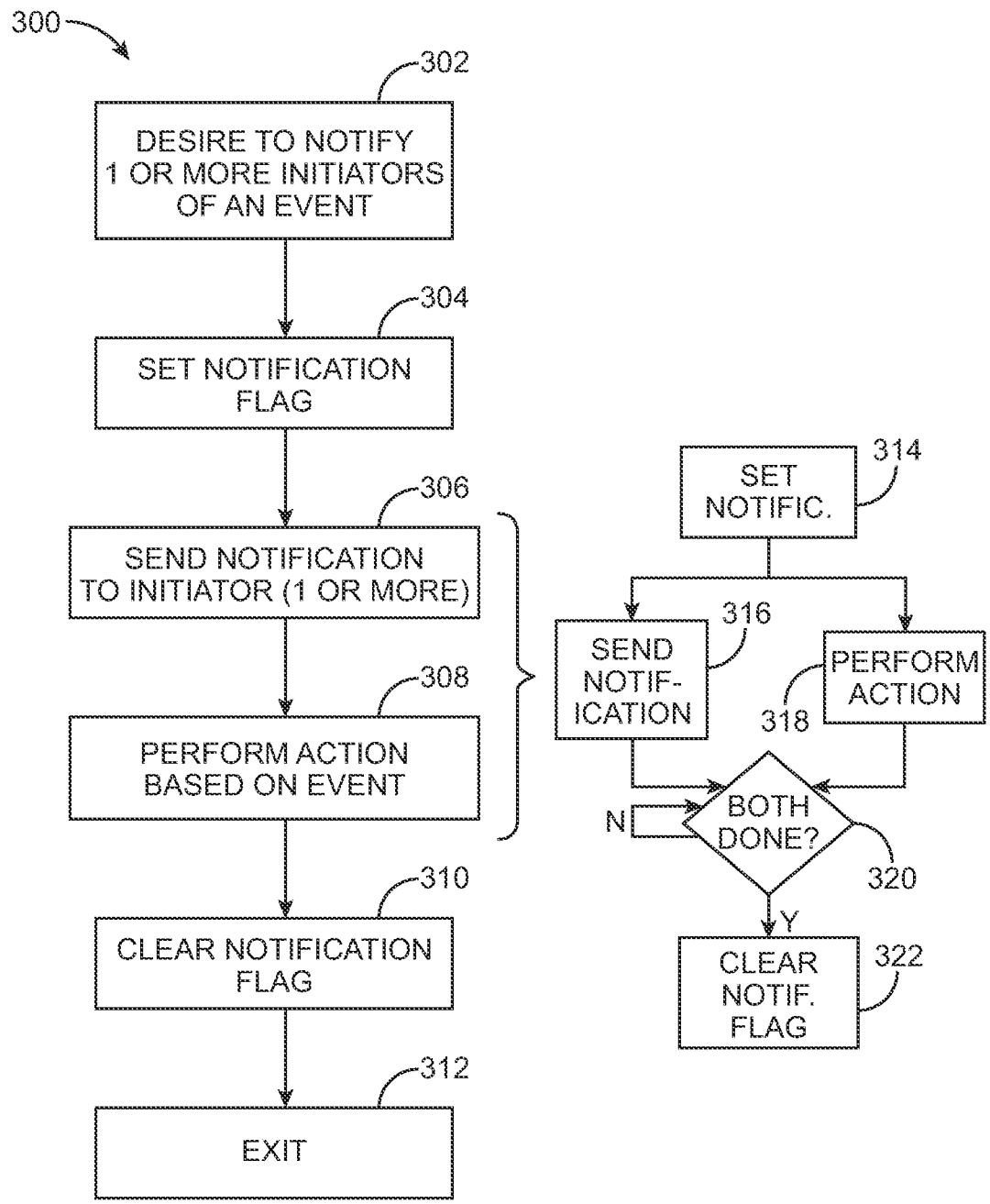

FIG. 7 shows a flow chart 300 of steps performed by the device 16 when it wishes to notify one or more initiators of an event, referred to as notification event(s) and alternative steps performed by the device 16.

Figure 8:
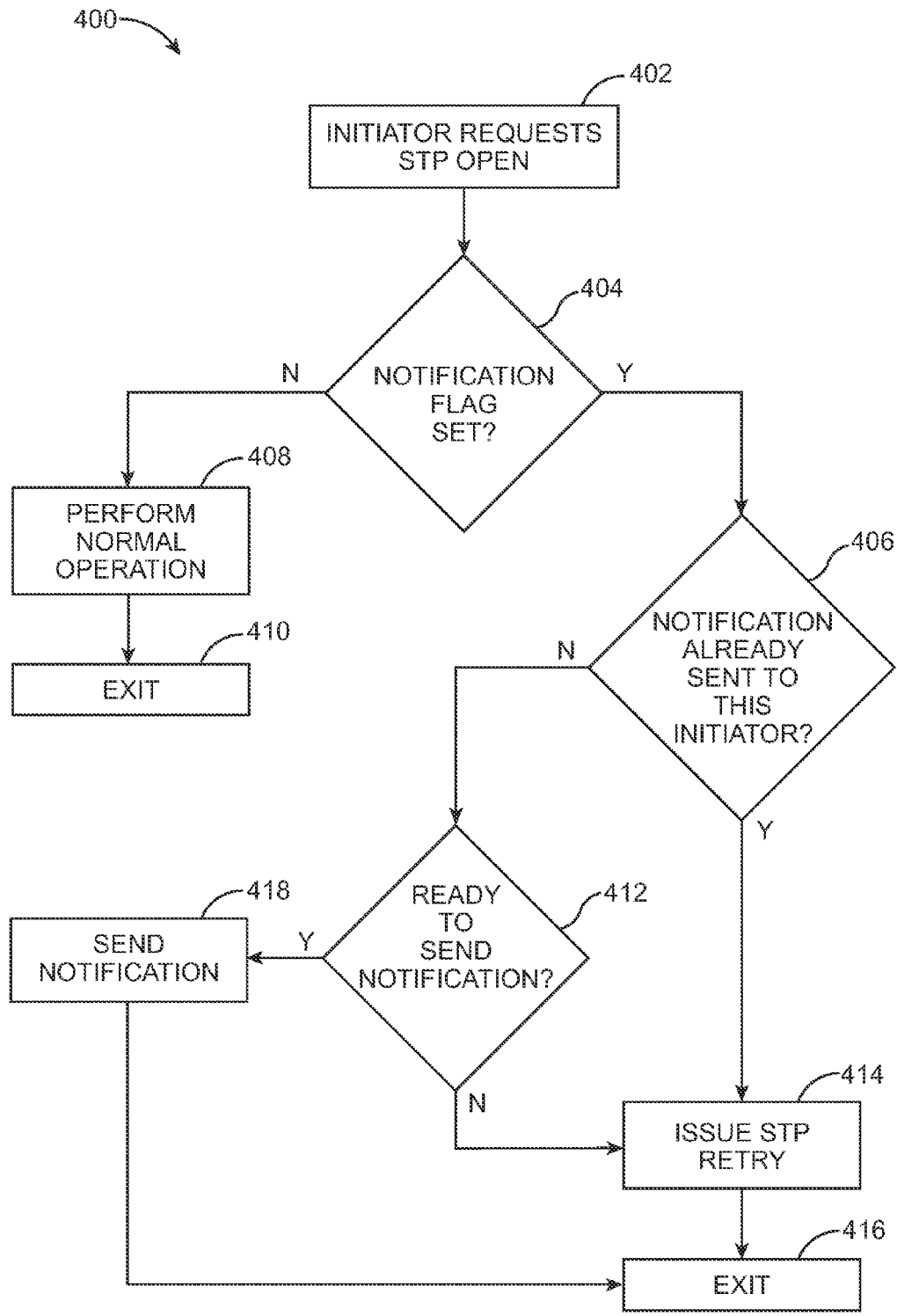

FIG. 8 shows a flow chart 400 of the steps performed by the device 16 and the one or more initiators being notified of an event during the time between the setting of the notification flag, at step 304 of FIG. 7, and the clearing of the notification flag, at step 310 of FIG. 7.

Figure 9:
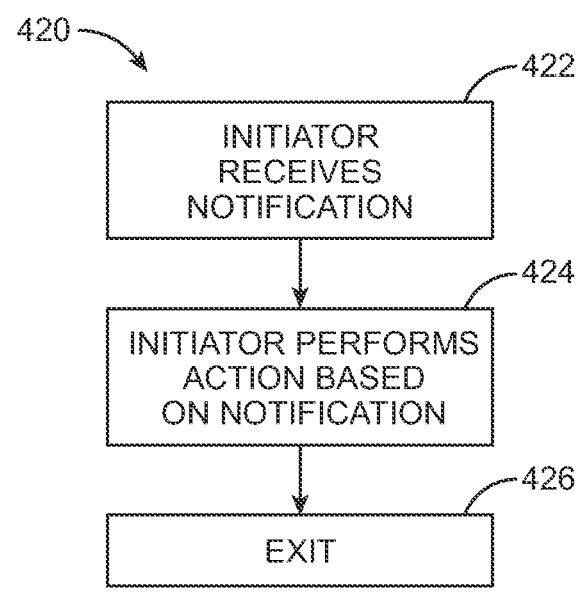

FIG. 9 shows a flow chart 420 of an example of the steps performed for clearing the initiator flag, at step 310 of FIG. 7, which may be done either by the device 16 or by the initiator, as previously stated.

Figure 10:
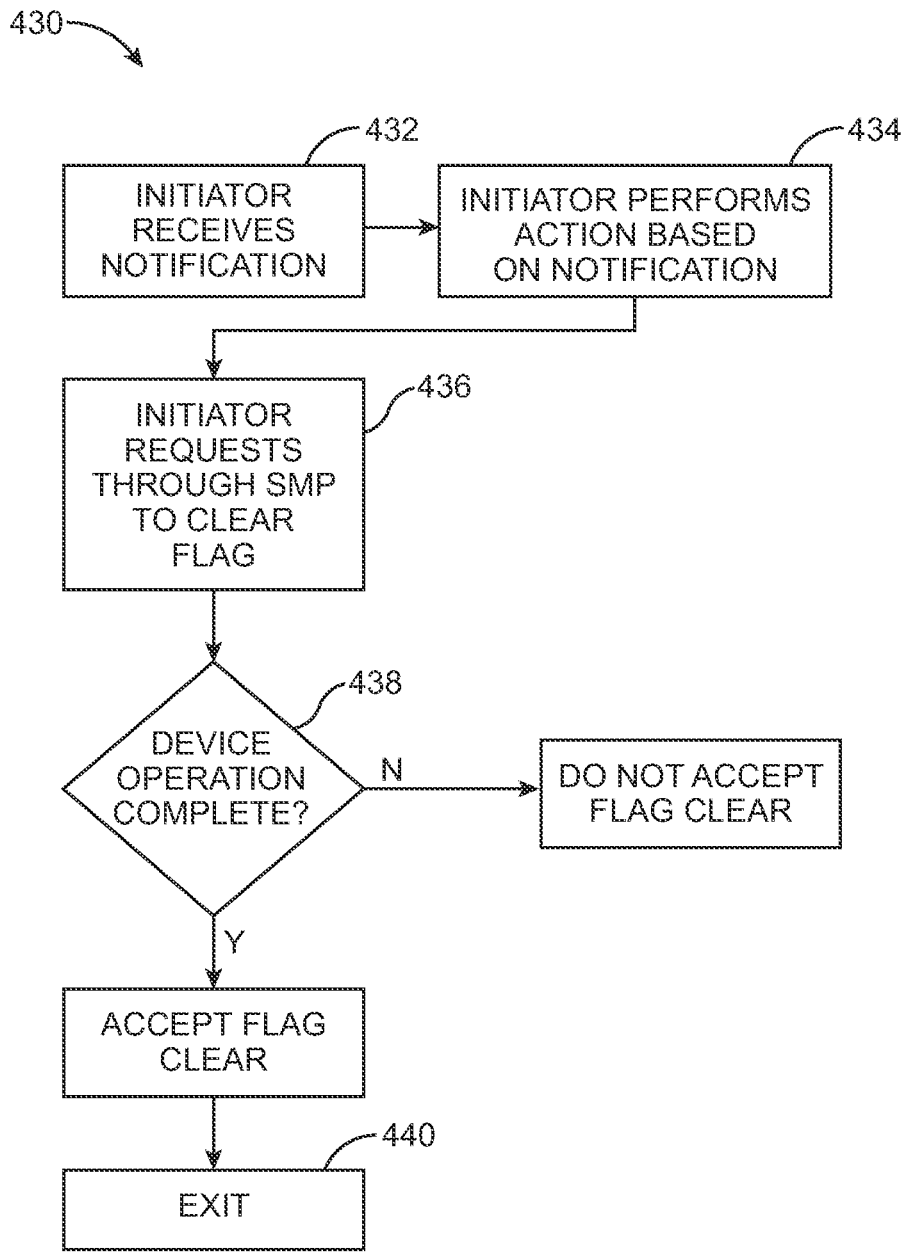

FIG. 10 shows a flow chart 430 of the steps performed for clearing the initiator flag, at step 310 of FIG. 7, as done either by the initiator.

Figure 11:
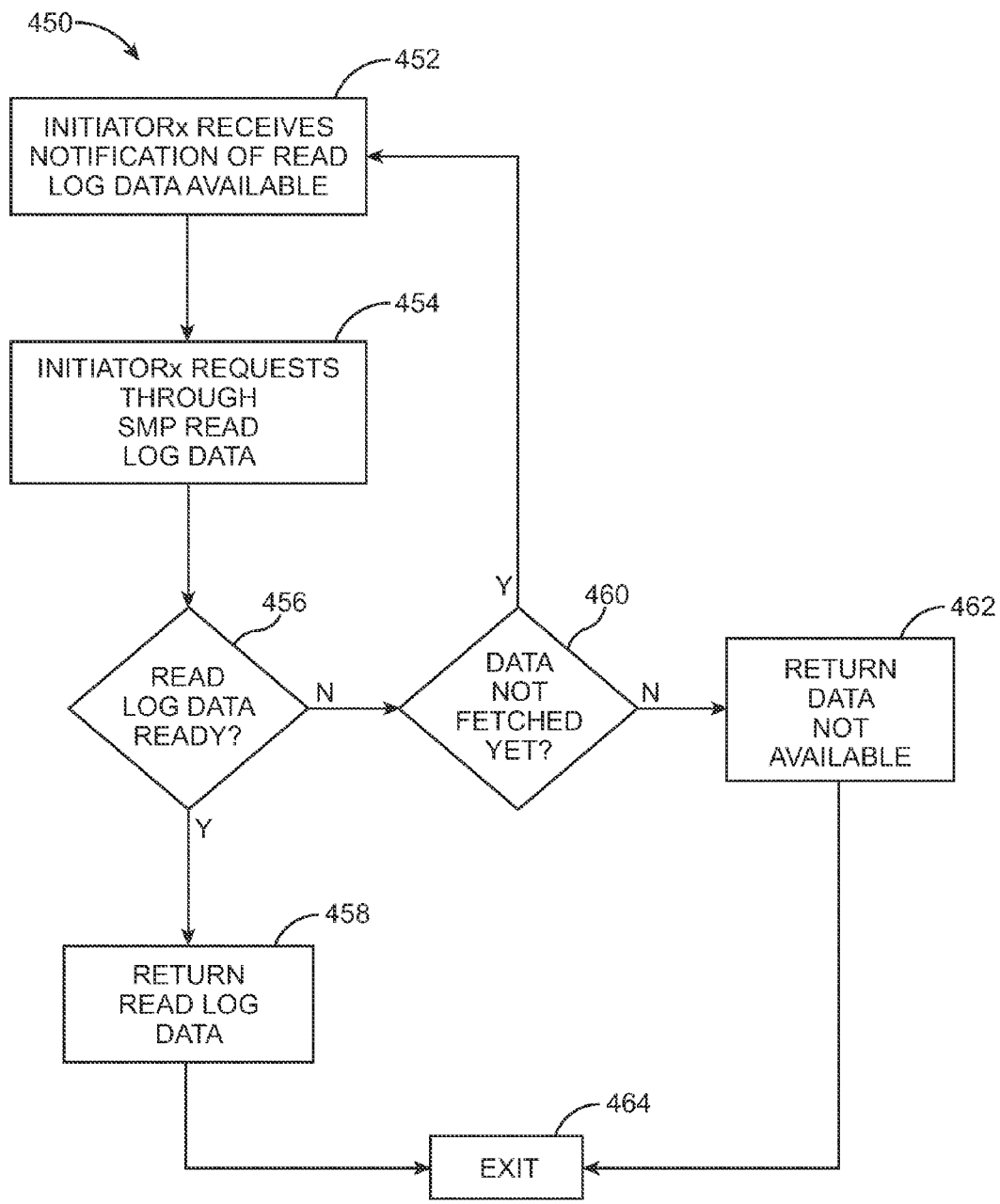

FIG. 11 shows a flow chart 450 of the steps performed when reading log data (Read Log Data) by an initiator.

Figure 12:
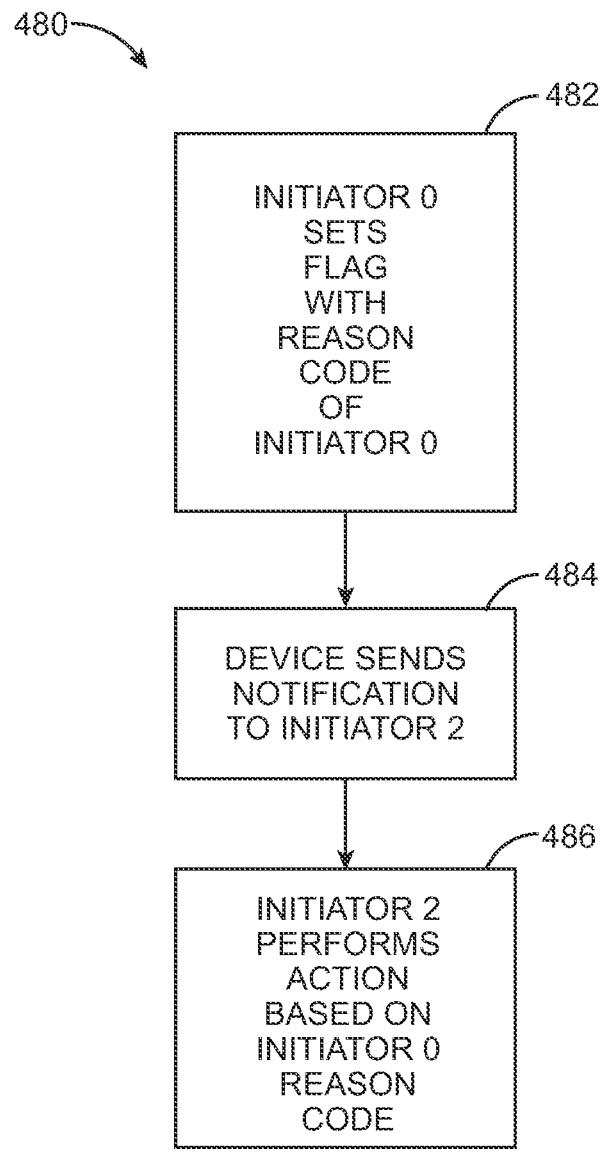

FIG. 12 shows a flow chart 480 of the steps performed in relation to a first mailbox making information between an initiator I0 and an initiator I2 available to one another.

Figure 13:
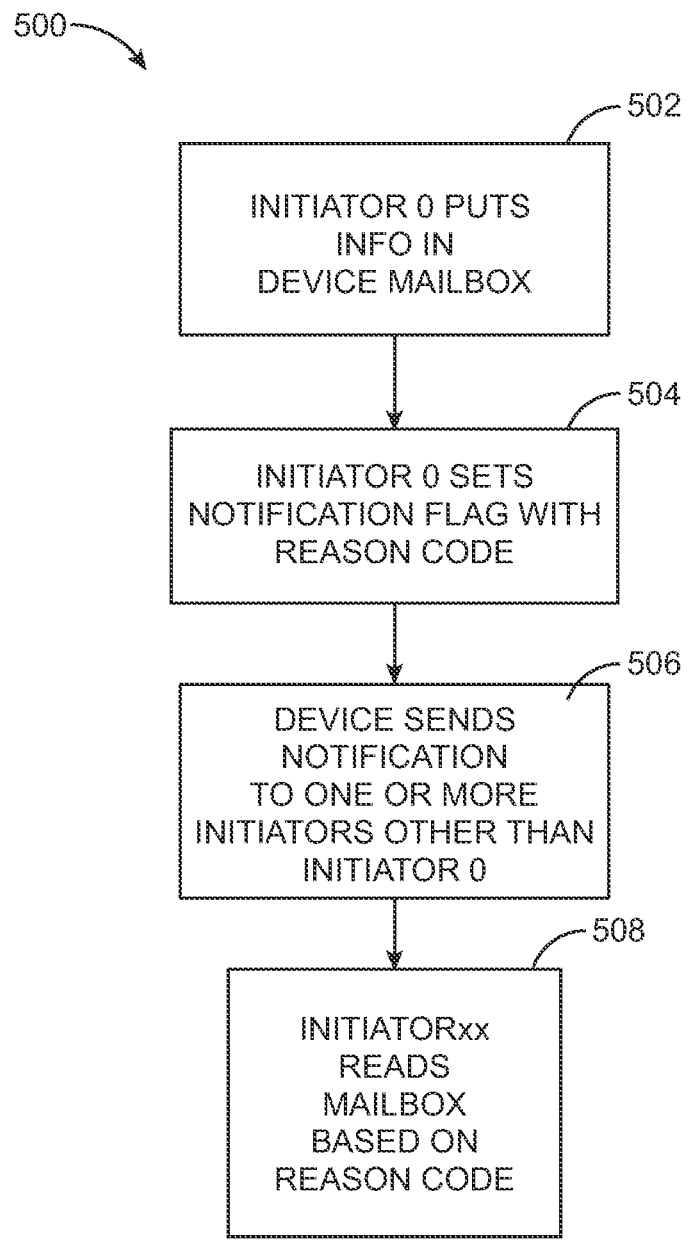

FIG. 13 shows a flow chart 500 of steps performed in relation to a second mailbox making information between an initiator I0 and an initiator Ixx available to one another.

Figure 14:
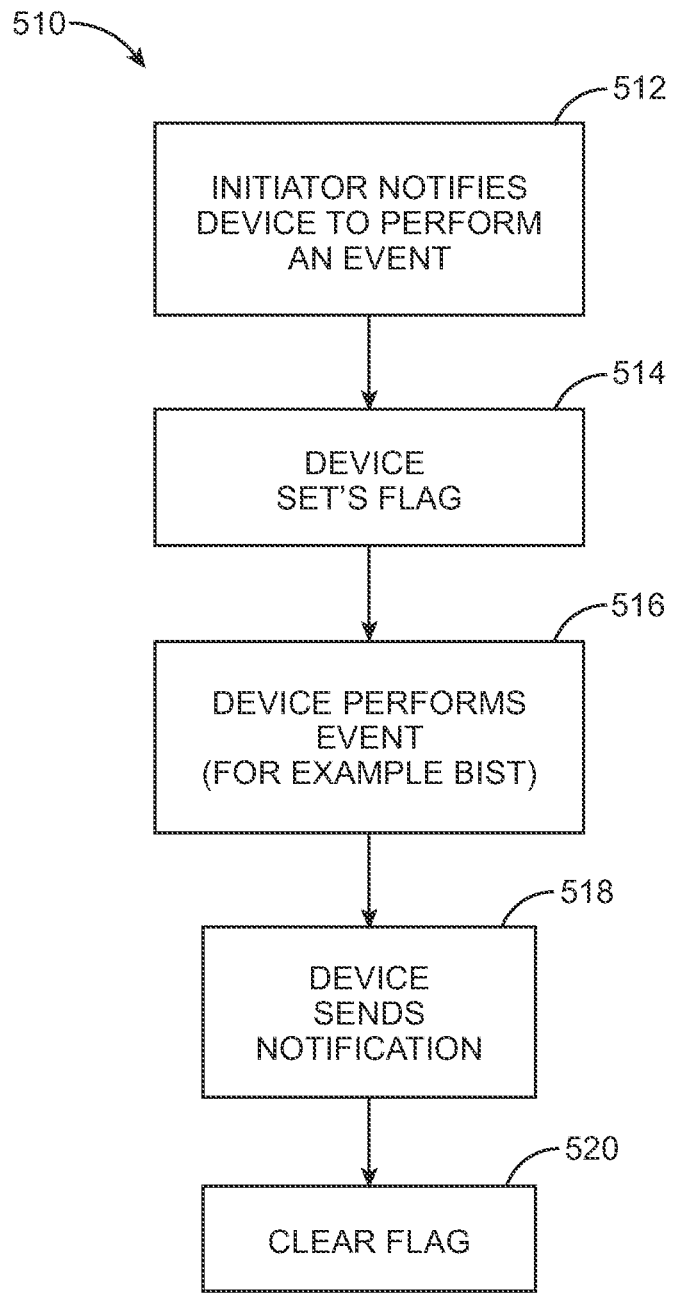

FIG. 14 shows a flow chart 510 of the steps performed for processing an event, such as but not limited to, BIST.

Figure 15:
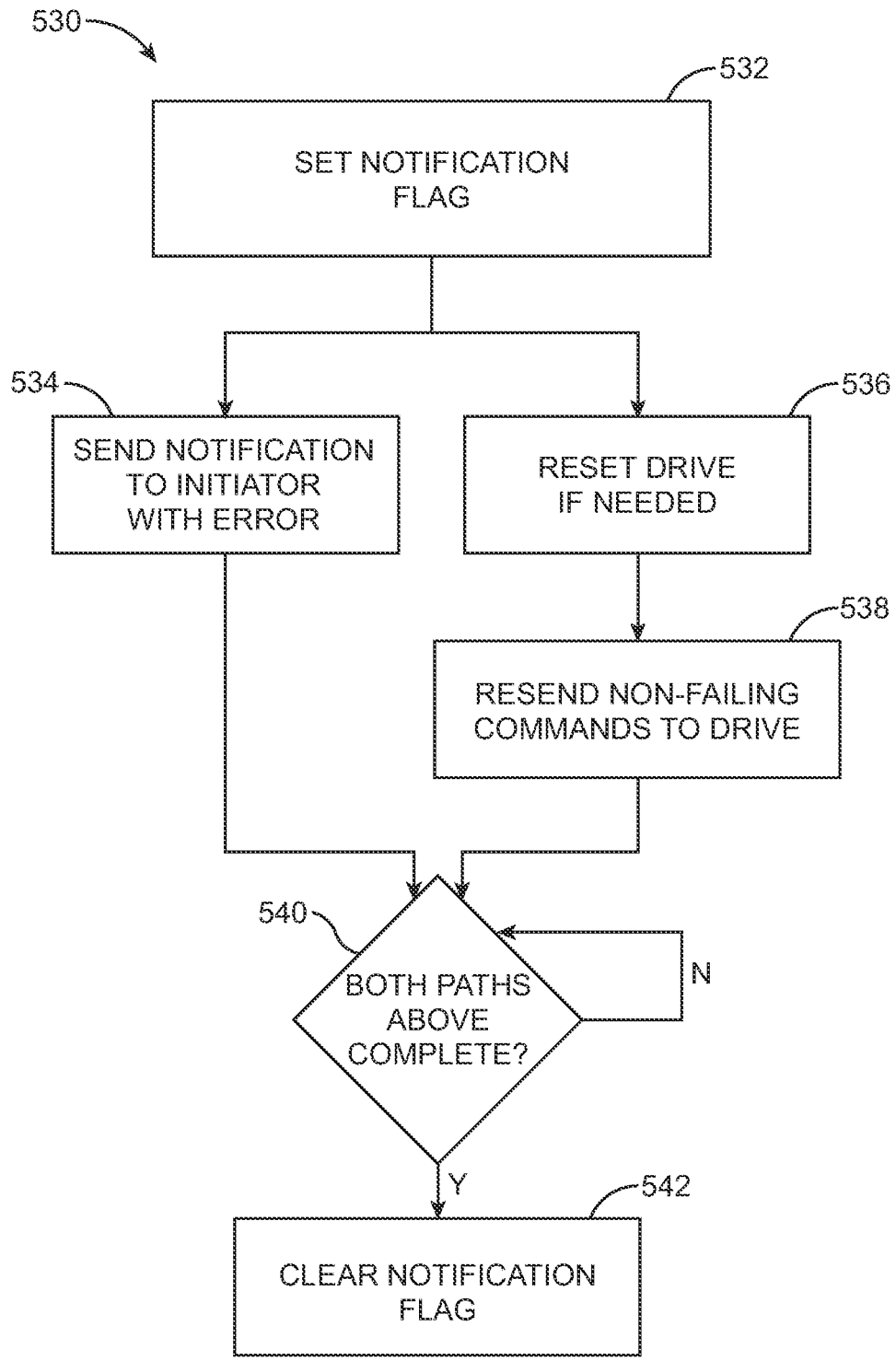

FIG. 15 shows a flow chart 530, of the steps performed for re-issuing (or re-sending) commands.

FIG. 16 shows the format of the Set Device Bit FIS.

DETAILED DESCRIPTION OF THE PREFERRED EMBODIMENTS

In large-scale memory systems, such as Redundant Array of Independent Disks (RAID), an improved bridge device is used to communicate between one or more hosts (or initiators) and a target. A host and initiator are used to refer to the same device herein. The target may be a disk drive for storing information provided by the initiators and accessed by the initiators. Alternatively, a target is a SATA device. The industry has standardized the interfaces (links) employed in this type of communication and as such, the interfaces conform to the SATA and Serial Attached SCSI (SAS) standards, well known in the industry.

An improved bridge device communicates with the initiators through multiple ports and with a SATA device, through a SATA port, or a port interfacing with the SATA device using the SATA standard. The bridge device is capable of communicating with a number of initiators while the initiators access a SATA device through the bridge device.

The bridge device acts as a bridge between the SATA device and the initiators. To further scale the system, expanders are employed between the initiators and the bridge device thereby allowing multiple initiators to communicate through a single expander. A memory system, such as the foregoing, is shown in FIG. 2.

Figure 1:
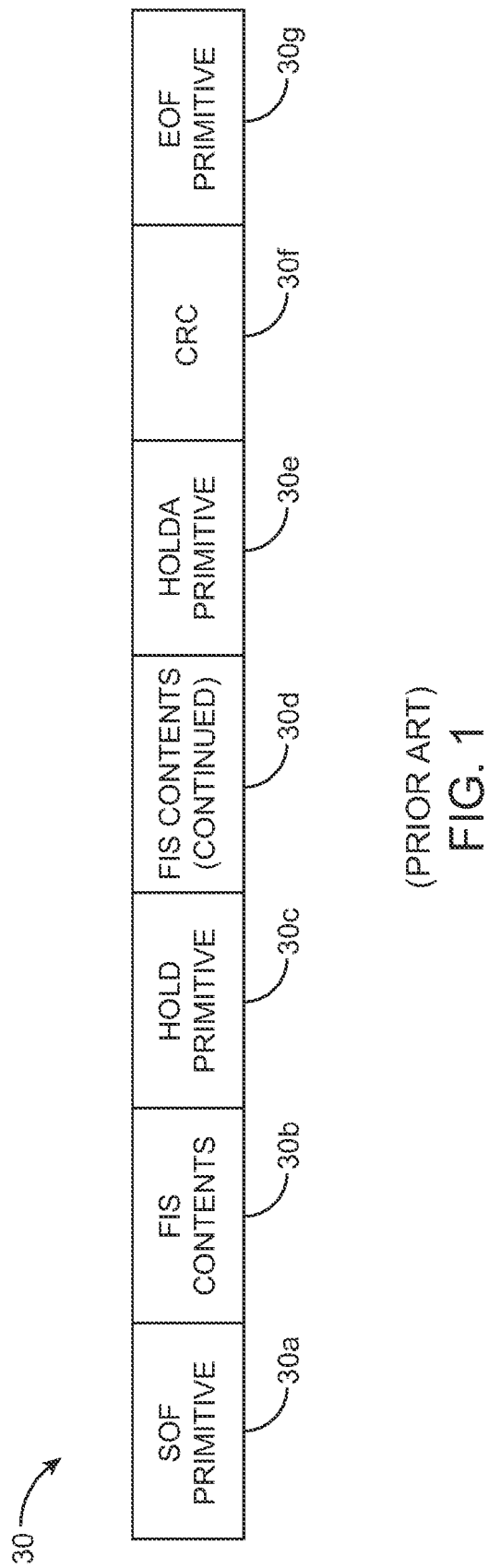
Figure 2:
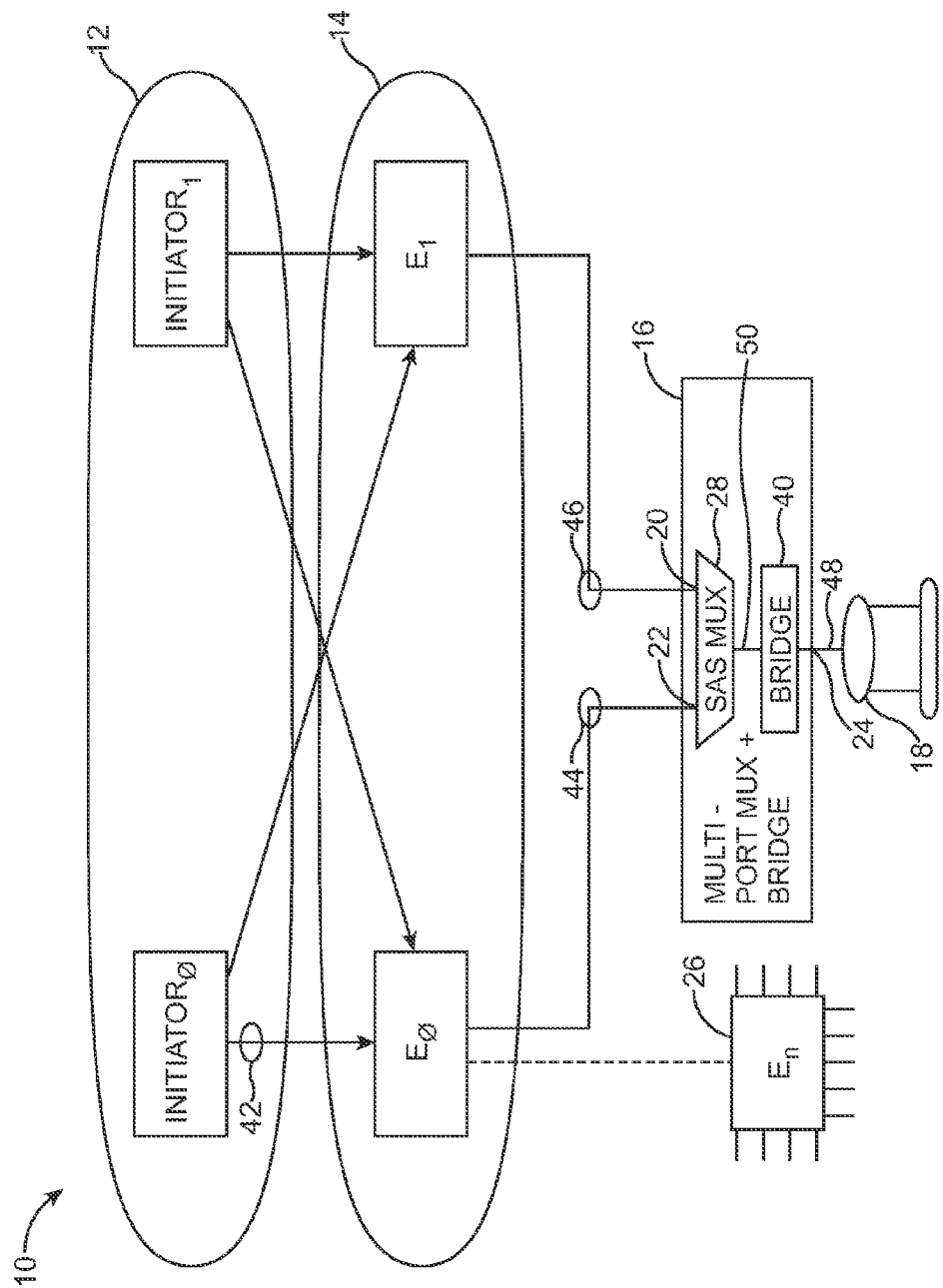

Referring now to FIG. 2, a memory system 10 is shown to include a group of initiators 12, I0 and I1, coupled to a group of expanders 14, E0 and E1, with the group of expanders being in communication with the multi-port bridge device 16, in accordance with an embodiment of the present invention. It is understood that while two initiators and two expanders are shown, any number of initiators and expanders may be employed. The expanders 14 are optional and in this respect, in other embodiments of the preset invention, they may be absent. The device 16 is a target. The expanders E0 and E1 function as switches and typically have many targets connected thereto and/or a hierarchy of expanders.

In an alternative embodiment, an expander among the expanders 14 of FIG. 2 includes an initiator.

The device 16 is shown coupled to the SATA disk drive 18. The disk drive 18 is a SATA drive or device and therefore communicates with the device 16 using the SATA standard. The device 16 is shown to include two SAS ports, ports 20 and 22, for causing communication with the expanders E0 and E1 using SAS interfaces. In another embodiment of the present invention, the device 16 includes a single SAS port, such as either the port 20 or the port 22.

Figure 4:
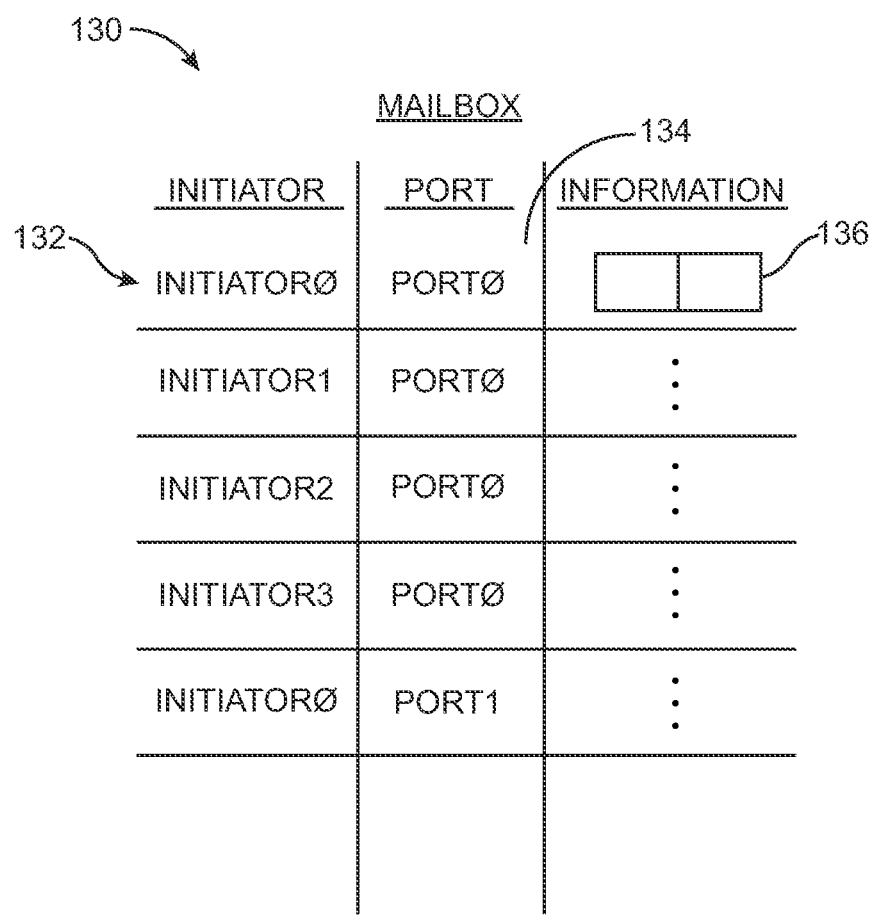
FIG. 4 shows an exemplary mailbox table 130 to for storing the mailbox o being a mailbox table of information maintained in the device 16.
Figure 5:
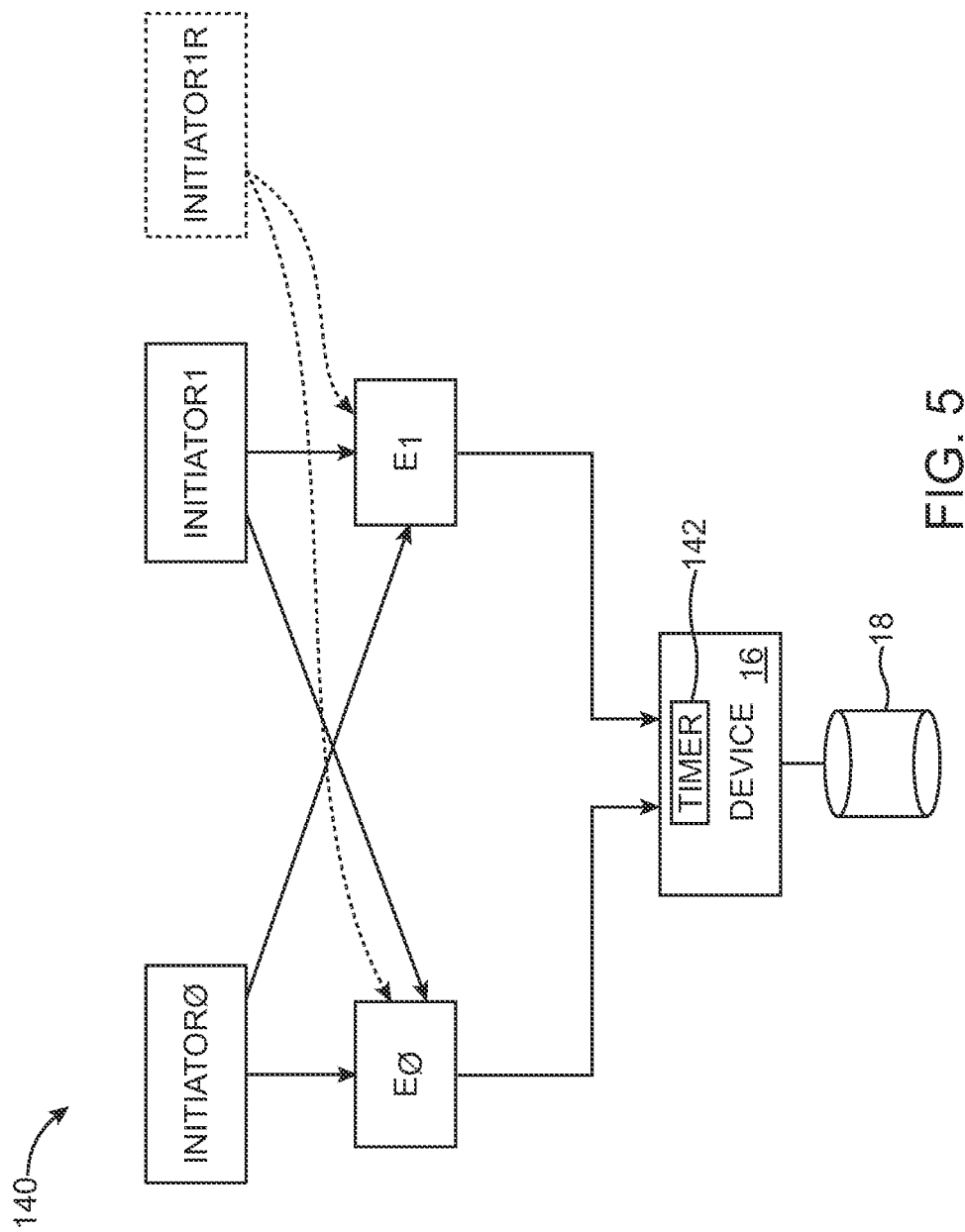
FIG. 5 shows a memory system 140 is shown in accordance with another embodiment of the present invention.

The device 16 uses a SATA port 24 to communicate with the drive 18 using the SATA standard protocols. The device 16 is multi-ported in one embodiment of the present invention although a single port device 16 may be employed. An example of a single port bridge device 16 is shown in FIGS. 3-5 of SATA Patent Document. Dual or multi-ported device 16 allows the SATA device 18 to be multi-ported. Dual-ported or having dual ports refers to having more than one communication path, which tends to increase performance due to having two paths because both paths are active at the same time.

While not shown in FIG. 2, in a practical application, the system 10 may include many drives, such as the drive 18, which may be coupled to expanders. For example, the expander 26 may be coupled to numerous drives and other than the expander 26, other expanders (not shown) may be employed to further couple other drives to the system. In the foregoing system, there would typically be numerous initiators as well. Some example applications of the system 10 of FIG. 2 include but are not limited to document storage and retrieval, photograph storage and retrieval, accounting software storage. Due to the large storage capacity employed, having multiple paths to a device, such as initiator, is highly desirable, as is various information regarding status thereof and errors. This clearly allows for more flexibility, better system performance and lower costs, among other benefits.

Alternatively, more than one device 16 is coupled to the drive 18, which further improves system performance.

Various topologies of the system 10 are anticipated, some of which are shown and discussed in U.S. patent application Ser. No. 11/644,549, filed on Dec. 22, 2006, and entitled "Serial Advanced Technology Attachment (SATA) And Serial Attached Small Computer System Interface (SCSI) (SAS) Bridging", the contents of which are incorporated herein by reference as though set forth in full. In the foregoing referenced patent document, FIGS. 2-7 show different topologies of the system 10 although additional topologies not included therein are anticipated. FIGS. 8 and 9 of the referenced patent document disclosed some details of the system 10, which apply to the embodiments and methods described herein in that the device 16 of FIG. 2 of the subject patent document includes the structures disclosed in FIGS. 8 and 9 of the referenced patent document.

Where there is more than one initiator employed, multiple problems arise, as earlier indicated, for example, with the initiators all wanting to access the drive and particularly when there is an error that, for example, may be caused by the drive. These problems are resolved by various embodiments of the present invention. In the case of errors, errors are reported to initiators and other information regarding the connectivity of the memory system is further optionally available to the initiators.

Errors may be caused in various ways. One common error is with the drive 18, as it may hang or simply become defective in certain areas due largely to its moving mechanical parts. Another type of error is with the transmitters or receivers (transceivers) of a device such as an initiator or an expander. An exemplary error can occur in the link between the initiator I0 and the expander E0 and more specifically at 42, in FIG. 2, which is likely to be caused by a problem in the transceiver of the initiator I0. In prior art systems, when such an error occurs or thereafter, the initiator I1 remains ignorant of the error and its cause and if the error is in the drive 18, both initiators I0 and I1 remain ignorant of the error and its cause.

The drive 18 is resettable and a method for so doing is presented and discussed with respect to a subsequent figure. For now however, it is noteworthy to mention that in accordance with the methods and apparatus of the present invention, multiple initiators may reset the drive 18, through on or more SAS ports, without dropping a link, such as at 44 or 46, to an expander. Moreover, communication of a reset on one port may be allowed to propagate to another port without dropping any links, at, for example, 44 and 46.

Another exemplary error can cause the links at 44 and 46 to be dropped and in prior art systems, the initiator I1 would have no information to determine whether the error was between the expander E0 and the expander E1 or in the device 16 or in the drive 18. In the various embodiments of the present invention, such information is made available to the initiator I1 by the device 16. In the case where the error is caused by the drive 18, bad status information is conveyed to the expander E0, by the device 16 and this incident is followed by the links at 44 and 46 being dropped. However, in prior art systems, the initiator I1, in this case, does not know whether the bad status resulted from a faulty media or drive 18 or whether it was caused by the links at 44 and 46. In the various embodiments of the present invention, information regarding the structure causing the error is reported by the device 16 thereby information the initiator I1 of the reason for the error. As is probably apparent by now, there are many more cases for which the embodiments and methods of the present invention facilitate communication of various types of information between the initiators of the plurality of initiators 12.

Tracking of errors and the number of times it occurs and whether or not the error is related to the drive are important information to the initiators because it can be used to improve system performance and reliability.

In one embodiment of the present invention, the device 16 includes a SAS mux 28 coupled to a bridge 40. It should be noted that while the device 16 is shown as having more than one port for coupling to a host or initiator, a single-port device 16 is anticipated, such as shown in FIGS. 3-5 of the SATA Patent Document, the disclosure of which is incorporated herein by reference as though set forth in full.

In one embodiment of the present invention, the device 16 includes input ports other than SAS ports, therefore, while the discussions herein surrounding the figures refer to SAS ports, the embodiments are not limited thereto. As an example, one or more SATA ports may serve as input ports to the device 16. SAS ports are ports interfacing using the SAS standard and SATA ports are ports interfacing using the SATA standard.

The mux 28 is operative to receive two or more inputs from two or more initiators, through expanders. In the embodiment of FIG. 2, the mux 28 is shown to receive input at its port 20 from the expander E1 and, at its port 22, from the expander E0. These are SAS input and must be converted to SATA in order for the drive 18 to be accessed. Thus, the output of the mux 28 is coupled to the bridge 40 where SAS is converted to SATA for communication with the drive 18.

While two initiators and expanders are shown in FIG. 2, any number of such devices may be employed. In fact, an added expander 26 may be optionally coupled to the expander E0 and to other disk drives without communicating through the device 16, which offers further scalability.

The initiators I0 and I1 of the group of initiators 12 cannot directly communicate to one another because they are not targets and they can only communicate with targets. In FIG. 2, for example, there is not direct path between the initiators I0 and I2. In this regard, for example, the expander E0 is a target to the initiator I1, therefore, the initiator I1 can communicate with the expander E0 as well as the expander E1 but it cannot communicate directly with the initiator I0. Similarly, the initiator I0 can communicate with targets, E0 and E1 but it cannot communicate with the initiator I1. For this reason, among others, the various embodiments of the present invention are necessary to facilitate communication between initiators even though none are targets.

During communication, initiated by an initiator, a Serial ATA Tunneled Protocol (STP)—SAS standard connection is 'opened', in accordance with the STP Standard and thereafter the SATA standard is used for communicating to the drive 18.

As will become apparent shortly, the various embodiments of the present invention allow the initiators to communicate with one another using a predetermined protocol.

The architecture of the device 16 allows the path for communicating control information to be independent of the path for communication input/output information. This is important in that the device 16 affords the system 10 greater system performance and efficiency. The way in which this is achieved, is at least, in part, due to the device 16 including a SATA bus 48 for use in communicating with the drive 18, through the port 24, and a separate SAS bus 50 for use in communicating with the expanders E0 and E1, through the ports 22 and 20, respectively. For a greater understanding of the architecture of the device 16, the reader is directed to U.S. patent application Ser. No. 11/644,549, filed on Dec. 22, 2006 and entitled "Serial Advanced Technology Attachment (SATA) And Serial Attached Small Computer System Interface (SCSI) (SAS) Bridging", the disclosure of which is incorporated herein by reference as though set forth in full.

By way of brief background, communication through the ports 20 and 22 is done using SAS standards. In this respect, SMP is performed to open a connection, initiated by an initiator, directing a target, such as an expander to communicate with the drive 18. Thereafter, the initiator sends a function to an expander and receives a response thereto and thereafter, the initiator closes the connection. Communicating through the port 24 entails STP, where a connection is opened and communication, using SATA, is performed back and forth between the drive 18 and the device 16. In the foregoing manner, SMP is performed substantially independently of SATA/STP.

In FIG. 3, the device 16 is shown to include a notification flag table 52 including three columns and as many rows as there are initiators and ports, such as the ports 20 and 22, which may be maintained, for example, in the memory 102 of the device 16 of the SATA Patent Document. The table 52 may be implemented in hardware or software. This table 52 is used to isolate, for example, an error that has recently occurred, in a manner that will be perhaps best understood by way of an example to follow.

Regarding the information in the table 52, the rows that appear under the column 'Initiator', or rows 54-60 each represent the state of a specific port and a specific initiator. For example, in row 54, the status of the initiator Initiator 0 (I0) and port 0 is shown by the information in the corresponding row under the column labeled 'Notification', which is effectively the state of the 'notification flag'. In row 56, the status of the initiator I0 and port 1 is shown by the information in the corresponding row under the column 'Notification'.

In row 58, the status of the initiator 1 (or I1) and port 0 is shown by the information in the corresponding row under the column 'Notification' and in row 60, the status of the initiator I1 and port 1 is shown by the information in the corresponding row under the column 'Notification'. In the case where additional initiators/ports are employed, the table would include information accordingly. 'Notification' flag, which is set or reset by the device 16, is used to indicate a problem/event of, for example, an error (or non-error) associated with a device, such as an initiator. Thus, being in a 'Notification' state, prevents a corresponding initiator from accessing the device 16.

In the case where, for example, the initiator I0 (in FIG. 2) wishes to inquire more information about an error or to isolate the cause of an error as to being in the drive 18 or between the device 16 and an initiator coupled thereto, the initiator I0 performs an SMP to open a connection and to then query the device 16 as to whether or not the device 16 is in 'Notification' event or the notification flag is set, which will be explained in further detail shortly. If the response thereto, by the device 16, is negative and the device 16 is not in 'notification event', the initiator I0 knows that the error is caused by the drive 18. On the other hand, if the response by the device 16 is positive and it is in notification event, further information regarding the error is passed onto the initiator I0. The device 16 will then respond to the query with information allowing the initiator to know the source of the notification. Thus, the initiator I0 has knowledge regarding the reason for the notification. If the notification is an error, the foregoing will be the source of the error.

The way in which the information in the storage device 52 is used to isolate an error is perhaps better understood relative to an example in a subsequent figure. For now, suffice it to say that the various embodiments of the present invention allow communication between initiators without a direct path between the initiators. This offers the initiators a greater insight into the topology of the system and therefore increases system performance by allowing greater time for the initiators to devote to input/output functions. As an example of such communication, errors are reported between initiators, through the device 16, as are reasons for the errors.

Yet another embodiment of the present invention allows the initiators I0 and I1 to have mailboxes for communication information, other than errors, to each other. The mailbox allows for one or more initiators to communicate information to each other without affecting SATA commands, such as STP.

I0 and I1 refer to initiators 0 and 1, respectively. In FIG. 4, an exemplary mailbox storage device 130 is shown to be a table of mailbox information maintained in the device 16. In one embodiment of the present invention, the mailbox storage table 130 is located in the memory 102 disclosed in the SATA Patent Document.

The table 130 serves as a way and mechanism for each of the initiators to pass information to one another. For example, in the exemplary embodiment of FIG. 4, the table 130 includes three columns and a number of rows whose number depends on the number of initiators. In column 132, the initiators are identified and in this example, there are four, I0-I3, in column 134, the ports are identified, which in this example, are Ports 0 and 1 or P0 and P1 and in the column 136, information that the associated initiator wants to pass along is included. The storage device 130 may be implemented in hardware, in for example, a register file or in software.

By way of example, the initiator I0, at SAS port 0 (or P0) includes the information in column 136 of the first row and in this manner, initiator I1, upon reading the contents of the storage device 130, is informed of the information that I0 passed on. In fact, I1, by reading the mailbox, is made aware of all of the information passed along by all initiators at all ports. In a typical example, the information in column 136 is in bytes. Examples of information that are passed on by initiators are similar to information about the drive 18, such as certain information that may be stored at a predetermined location within the drive 18 that is or may be of interest to other initiators. For example, I0 may indicate that in sectors 5 and 6 are stored information that needs to be read and then by becoming informed of the same, I1 might choose sectors 7 and 8 for the same thing. The key being that different sectors within the drive 18 are used by I0 and I1 thereby avoiding any collision therebetween. Another example is the length of time remaining prior to a particular initiator going off-line and if this initiator is managing system functions, another initiator might now know to come in and take over the functions handled by the initiator going off-line after the latter initiator has gone off-line.

As will become further evident with respect to FIG. 6, a affiliation counter 152 is used to track changes to the current topology of the device 16 and the same counter is then used, in the mailbox, to track an initiator's reading of the current topology.

Thus, initiators have the capability of storing information into their designated area within the table 130 and the capability of reading the table 130 to either become aware of newly-stored information and/or receive a response to a previously-posed issue or request by an initiator. In this manner, a 'reason code', identifying information regarding an event, may be used to indicate a problem that would direct an initiator to read the mailbox to become aware of the nature of the problem.

In another embodiment and method of the present invention, an initiator's failure to properly operate, or for reasons other than failure, results in a replacement (R) initiator replacing the failed (or soon-to-be replaced) initiator without any down-time, such as re-boot or power-down, experienced by the system 10 and without the need for physically removing the failed initiator, such as an initiator I1 and with the same functions as that having been handled by the failed initiator being now performed by the replacement initiator, initiator 1R. This is illustrated, by way of example, in FIG. 5.

In FIG. 5, a memory system 140 is shown in accordance with another embodiment of the present invention to include an initiator I0 in communication with expanders E0 and E1 and an initiator I1 in communication with the expanders E1 and E1. The expanders E0 and E1 are shown coupled to the multi-port bridge device 16, which is shown coupled to the SATA disk drive 18.

A practical example application of the foregoing is when a web site is intended to be re-constructed, in which case, an initiator may have to be rendered inoperable and effectively removed from the system whether for failure or otherwise, and replaced with another initiator with no down-time to the system.

In the case, for example, where I1 fails, it will be permanently in 'notification event reset', which serves to unnecessarily consume valuable system bandwidth. In this embodiment of the present invention, I1 is replaced with an I1R initiator that will take on the functions of I1. To do so, the device 16 needs to reclaim its resources.

Within the device 16, there is a timer 142 measuring the period of time during which I1 is in 'Notification' and when or if this measured period of time exceeds a predetermined threshold, the device 16 decides to remove I1 (or render I1 inoperable) from the system 10. In one embodiment of the present invention, the latter is reflected in the table 150.

When I1 is removed from the system 10, its notification event is cleared (or the notification flag is reset) as are all other functions or attributes associated with I1 essentially clearing the slate for I1R to start anew.

When a replacement initiator is placed into the system 10 replacing another initiator, while the replaced initiator's tasks are taken over by the replacing initiator seamlessly, the initiators that have not been replaced remain ignorant of this replacement or change in the system topology. Thus, in yet another embodiment of the present invention, initiators are made aware of a system topology change, such an initiator replacing another initiator.

FIG. 6 shows an affiliation table 150 and the mailbox table 130, each being located in the device 16, in accordance with another embodiment of the present invention. The table 150 stores a table of affiliations of the initiators in the system while the mailbox table 130 stores mailbox information, as previously discussed. Both tables are maintained by and located in the device 16 of the embodiment herein.

The table 150 has associated therewith an affiliation counter 152. Whenever any values or states change within the storage device 150, the counter is incremented by one. The table 150 includes information based on slots, which are identified based on ports. For example, at slot 0 of table 150, in the first or top row of the table 150, the initiator 0, or I0, at port 0, which is, for example port 22 (in FIG. 2), in the corresponding row of column 156 is indicated as being 'valid'. 'Valid' indicates that the entry of the corresponding row is valid, whereas, invalid indicates that the corresponding row information is invalid. Each time there is a change to the table 150, the counter 152 is incremented by one. When the count of the counter 152 exceeds the number of bits of the counter 152, the latter rolls over to zero.

In the first column of each of the rows of the table 150, there is additional stored initiator addresses. For example, in the first row of the table 150, the address identifying initiator 0 is stored in the first column 156.

With respect to the table 130, whenever an initiator reads the state of the table 150, the counter 152 of the table 130 is compared to that of the counter 152 of the table 150, both of which counters are physically the same counter, and if the state of the count is the same, the topology read is current and if not, the topology read is not current. That is, the counter 152 is further used by an initiator to become aware of a change in topology, such as a replaced or new initiator having been introduced.

The initiators are then informed of the exact change by reading the table 150. This is important because, for example, an initiator that had a request or information out to another through the table 130 would not receive any information if the initiator from which information is requested has failed or is being replaced. By reading the table 150, the requesting initiator becomes aware of the same. Upon a mismatch of the current value in the counter 152 and a previous value therein, i.e. the value of the counter the last time the initiator read the table 150, an initiator is alerted of a change in topology and knows then to read the table 150 to become aware of the particular change.

In FIG. 6, the table 150 is used to control parameters in the system. That is, through, for example, SMP, the depth of the table 150 for each port may be limited to a fixed or predetermined depth. Through SMP, the values in the columns of the table 150 can be controlled, which allows affiliated SAS addresses for one or more ports to be moved, atomically, to a new set of SAS addresses. That is, the table 150 can be changed unilaterally by the device 16 to control or limit access by initiators to the SATA device. In this manner, the depth of the table 150 as well as access thereto are controlled or changed by the device 16. For example, addressees of initiators may be unilaterally altered to effectively limit access to the table 150. This further allows for the number of affiliated initiators to be limited to a value less than the maximum number of affiliations for a particular SAS port.

Alternatively, a table other than the table 150, or an expanded version of the table 150, may be employed to unilaterally control access to the device 16 by expanders. For example, an expander affiliation table, similar to the table 150 or the table 150 expanded to include expanders, is used to describe affiliations with expanders and the device 16 is capable of altering its depth and addresses to limit access by the expanders to the SATA device.

In yet another embodiment of the present invention, the expander(s), such as the expanders 14 of FIG. 2 include an affiliation table, similar to the table 150, used to describe affiliations between expanders and the device 16 and altering the depth of the table and addresses to limit access by the expanders to the SATA device.

The foregoing advantageously offers value to any SAS port that maintains affiliation, such as SAS mux and expanders. Also, through the foregoing, a way of atomically moving the affiliations from one set of initiators to another set of initiators is offered. Also, it is possible to deliberately disallow one or more initiators to access the device 16. An example of the use of such a feature is the case where an initiator has high operational bandwidth such that it need perform on the device 16 yet it does not wish the other initiators to use any of the bandwidth.

In another embodiment of the present invention, extra initiators are used for failover so that when an operational initiator is working, the failover initiators cannot gain access to the device 16. However, when a failure occurs, the affiliation can be flexibly moved to the failover initiators immediately and the system is once again operational.

Still alternatively, the affiliation table is cleared automatically of any initiator addresses associated with initiators that exceeded a predetermined time period during which they were to respond or communicate with the device 16. If timeout occurs, the SAS address associated with the initiator that caused the timeout is taken out of the affiliation table.

FIG. 7 shows a flow chart 300 of steps performed by the device 16 when it wishes to notify (notification event) one or more initiators of an event, referred to as notification event(s). Examples of an event include but are not limited to the occurrence of an error in the drive or SATA device or a 'BREAK' primitive in the SAS link or providing of status. The 'BREAK' primitive is defined in the SAS specification. Further and more specific examples of notification events are provided below.

In FIG. 7, at step 302, the device 16 wishes to notify one or more initiators, such as I0 or I1, of an event. This causes the next step 304, inter-notification, i.e. set notification flag state to be entered, to be executed (or an event flag is set). Next, at step 306, a notification is sent to the one or more initiators. Next, at step 308, the action, based on the event, is performed. While other examples are anticipated, a few examples of action based on an event (of step 308) are:

1. SATA device (or drive) with an error is an example of an event causing inter-notification and the action performed at step 308 is to fetch and store the read log data 2. An initiator requests for purging of all of its command, which is the inter-notification event and the action is to purge all of the requesting initiator's commands
3. The inter-notification event is non-recoverable drive error and the action is to reset the SATA device or drive
4. The inter-notification event is an initiator requests sending notification with a reason code to all initiators to read their mailboxes and the action is to use the reason code when sending notification back to initiators While the foregoing provides some examples of action based on events, others are anticipated.

Next, in FIG. 7, at step 310, the notification flag that was set at step 304 is cleared. Clearance of the notification flag may be performed either by the initiator or by the device 16 and it is typically in the form of a primitive or frame. Next, at step 312, the notification process concludes.

While other examples are anticipated, a few examples of clearing the notification flag (of step 310) are:
1. The device 16 may clear the notification flag automatically and then stop issuing open reject (retry), which is a primitive to reject the open request or other types of primitives to reject the open request.
2. Initiator may request the device 16 to clear the notification flag through an SMP connection and the device 16 may accept or reject request to clear the notification flag.

It should be noted that while notification is shown as being sent at step 306 followed by the performance of the action based on the event at step 308, it is understood that notification may be sent at the same time the action is being performed or notification may be sent after the action is performed. In this manner, step 304 is shown as step 314 where the notification flag is set and thereafter, rather than step 306, steps 316 and 318 are performed at the same time. Alternatively, the notification flag is set before the action is performed. At step 316, notification is sent and at step 318, action based on the event is performed and when both of these steps 316 and 318 are completed as noted at 320, the notification flag is cleared at step 322.

The following are some examples of notification events:
1. ERROR on SAS bus
2. ERROR on SATA bus
3. ERROR on SATA drive (or device)
4. Desire to execute built-in self test (BIST)

The following are some examples of notification sent to one or more initiators by the device 16:
1. Set device bit FIS with
   N=1 (N indicates notification and appears in a field in FIS)
   I=0 (I indicates interrupt and appears in a field in FIS)
2. Set device bit FIS with
   N and I, each are 1 or 0
3. Set device bit FIS with
   Port Sel bits not equal to 0
4. Set device bit FIS with other predefined bits, which may include a reason code identifying the reason code, i.e. a code used to identify the reason for the notification. The notification is typically in the form of a primitive and can announce, for example, a change to the topology of the system. The format to the Set Device Bit FIS, as defined by the SATA Rev. 2.6 standard, is shown in FIG. 16.

In an alternative embodiment, an initiator may set the notification flag, at inter-notification between steps 302 and 304, after storing information in the mailbox. Still alternatively, the notification flag may be set with a reason code that conveys the information intended to be communicated to another initiator.

In yet another embodiment of the present invention, the initiator is interrupt driven with events on the device 16 that do not require querying an expander to find the location of the event, as required by prior art systems. Yet alternatively, the initiator is interrupt driven with events on the device 16 that do not require links to the expander to be dropped therefore improving system performance.

Still alternatively, when the device 16 generates a notification to the initiator, the initiator driver may use the notification frame or primitive as an interrupt to itself so as to avoid polling for status. Upon the occurance or detection of an interrupt, the initiator branches to process the interrupt. In this manner, the initiator does not need to poll for status, which improves system performance. Furthermore, links are not dropped, which also improves system performance.

FIG. 8 shows a flow chart 400 of the steps performed by the device 16 and the one or more initiators being notified of an event during the time between the setting of the notification flag, at step 304 of FIG. 7, and the clearing of the notification flag, at step 310 of FIG. 7.

In FIG. 8, at step 402, the initiator, for example I0, requests an STP connection to be 'opened' to communicate with the device 16. Next, at 404, it is determined, by the device 16, whether or not the notification flag is set and if so, at 406, another determination is made as to whether or not the notification is already sent to the initiator I0. If, at 404, it is determined that the notification flag is not set, the process continues to step 408 wherein normal operation proceeds and at step 410, the process outlined by the flow chart 400 ends. If at 406, if it is determined that the notification is already sent to the initiator, I0, the process continues to step 414 wherein an STP connection is retried and the process ends at 416. The retry at step 414 results in waiting for the initiator to request another STP open connection, as in step 402. If at 406, it is determined that the notification is not already sent to the initiator I0, the process proceeds to 412 wherein a determination is made as to whether or not the device 16 is ready to send the notification and if so, the notification is sent at step 418 and the process continues to step 416. If, at 412 it is determined that the notification was not sent, the process continues to step 414.

FIG. 9 shows a flow chart 420 of the steps performed for clearing the initiator flag, at step 310 of FIG. 13, which may be done either by the device 16 or by the initiator, as previously stated. Using the example of the device 16 clearing the notification flag, at step 422, the initiator receives the notification, which occurs at step 306 of FIG. 7, from the device 16, of an event and the initiator, at step 424 performs an action based on the notification. An example of such an action, although not limited thereto, is cleaning or clearing commands sent by the initiator, regarding, for example, an error and the device 16 also cleans or clears its commands, for example, regarding an error and the process ends at 426. The way in which the initiator is made aware of the device 16 having cleared its error is by trying and re-trying to open STP connections with the device 16 until it is successful in doing so because while the error(s) has not been cleared, the STP connection will not be 'opened'.

FIG. 10 shows a flow chart 430 of the steps performed for clearing the initiator flag, at step 310 of FIG. 13, as done either by the initiator. At step 432, the initiator receives notification, next, at step 434, the initiator performs an action based on the received notification, such as but not limited to cleaning up its commands, next at step 436, the initiator requests, through an SMP connection, to clear the notification flag. Next, at 438, it is determined whether or not, clearance of the notification flag is accepted by the device 16 and if not, the process goes back to step 436, otherwise, the process ends at 440. The process between 438 and 436 goes back and forth until clearance of the notification flag is accepted at 438. The delay, if any, is caused by the device 16 being occupied with other tasks.

An SMP connection response may include a reason code and/or read log data and/or information related to one or more errors.

A discussion will now be presented regarding "Read Log Data". A "Read Log Data" is error information generated by the SATA drive regarding one or more errors that occurred in the SATA device or drive. In an alternative embodiment, any type of log information or data, i.e. log data, may be used instead of the read log data and therefore contemplated. Therefore, all discussions and figures herein of read log data apply equally to log data. The Read Log Data advantageously avoids loss of error information, which occurs in prior art systems. For example, when the drive experiences an error, information regarding the error is cleared when the drive is reset, thus, information that may be very useful, is lost. By reading the read log data, this loss of information is avoided. Additionally, collision of information from multiple initiators after a drive reset is avoided by the read log data. Another problem advantageously avoided by the read log data is in remapping of tags. Tags may be remapped, in the read log data, to dynamically assign them to different initiators. Tags are associated with initiators and used by initiator to correlate received information with a command.

The read log data may be altered to ensure consistency with the initiators' tags. In one embodiment of the present invention, using the standards stated hereinabove, read log data may be information from the "read log ext" command or other data on the SATA drive representing error information.

The read log data may include error information or other types of information relevant to the device 16 and/or initiators. Examples of various ways of fetching or retrieving the read log data are as follows: Attributes of Read Log Data are:
 1. Initiators may fetch based on selected method.
 2. Issue SMP request for read log data
 3. Issue SMP request to clear flag—response may include read log data
 4. Device 16 could fix up this data and send this through STP or SATA An example of an error log is SATA 'read log ext' command.

In another embodiment of the present invention, reserved tags are used. Reserved tags are tags that are available for being assigned but are not yet assigned to initiator tags. An initiator tag is a tag associated with a command and is generally included in a command allowing the initiator to associate certain information with the command in which the tag is included. Reserved tags are dynamically assignable from the initiators' tags based on in-coming initiator commands, wherein the reserved tags are used for issuing commands to the SATA device. In-coming initiator commands are commands received by the device 16 from initiators.

Upon clearing an affiliation, by an initiator, all tags assigned to the initiator that is clearing the affiliation are also cleared. In one embodiment of the present invention, the initiators are assigned reserved tags that are in sequential order so that the association of tags and initiators is known based on the tags' numbers. Alternatively, the assigned reserved tags are not in sequential order. The device 16 clears affiliations associated with initiators to reclaim the assigned tags.

An initiator may set the notification flag, as previously noted, through an SMP connection. Additionally, notification may go to all affiliated initiators or all affiliated initiators with commands pending the device 16. Affiliation is a way of limiting acceptance of connection requests (to the device 16) from initiators, in accordance with the SAS standard. Affiliation therefore allows activity from a predetermined number of initiators onto the device 16. Once the predetermined number is reached, no more initiators can communicate through STP to the device 16 until an initiator clears it's affiliation. That is, when table 150 fills up, no more affiliations may be added until one of the 'Valid' bits in the last column of the table is reset, at which time, additional affiliations may be added to the table 150, as many as there are reset 'valid' bits.

FIG. 11 shows a flow chart 450 of the steps performed when reading log data (Read Log Data) by an initiator. In FIG. 11, an initiator x, Ix, is used as an exemplary initiator for the purpose of discussion. This is one of many ways of fetching the read log data.

At step 452, the Ix receives notification of Read Log Data being available, from the device 16. Next, at step 454, the initiator Ix requests, through an SMP connection, to read log data. Next, at 456, a determination is made as to whether or not the read log data is ready and if not, the process continues to 460 wherein a determination is made as to whether or not the read log data is not yet fetched and if not, at step 462, 'read log data not available' response is returned. If at 456, it is determined that the read log data is available, at step 458, the read log data is returned and the process of FIG. 11 ends at 464. If at 460, it is determined that the read log data is not fetched yet, the step 462 is performed wherein 'read log data not available' is returned. It should be noted that notification may be sent before or after the read log data is fetched.

FIG. 12 shows a flow chart 480 of exemplary steps performed in relation to an initiator, I0, setting the reason code with the information intended to be conveyed to other initiators, which in this example is initiator I2. At step 482, the initiator I0 sets a notification flag with a reason code (step 304 of FIG. 7). Next, at step 484, the device 16 sends a notification to the initiator I2. Next, at step 486, the initiator I2 performs an action based on I0's reason code that accompanies the flag set by I0 (at step 482). In the foregoing manner, I2 and I0 communicate and even perform certain actions based on their communication (action based on event).

FIG. 13 shows a flow chart 500 of steps performed in relation to a second mailbox making information between an initiator I0 and an initiator Ixx available to one another. At step 502, the initiator I0 stores information in a predetermined location of the mailbox 130 of the device 16. Next, at step 504, I0 sets a flag with a reason code of I0 in the mailbox so that anyone reading the mailbox becomes aware of the reason for which information is stored in the mailbox by I0. Next, at step 506, the device 16 sends a notification to the initiator(s) alerting them of the information stored in the mailbox. Next, at 508, the initiator, Ixx, reads the mailbox based on the reason code provided by I0 at step 504. In this foregoing manner, I0 and Ixx communicate with each other using the mailbox 130 of the device 16.

FIG. 14 shows a flow chart 510 of the steps performed for processing an event, such as but not limited to, BIST. In FIG. 20, at step 512, an initiator notifies the device 16 to perform an event. Next, at step 514, the device 16 sets an appropriate flag, such as an event flag. Next, at step 516, the device 16 performs an event requested or notified by the initiator at step 512. The event, in one example, is BIST, thus, the device 16 performs BIST. Next, at step 518, the device 16 sends a notification indicative of having performed the event. Next, at step 520, the event flag is cleared.

FIG. 15 shows a flow chart 530, of the steps performed for re-issuing (or re-sending) commands. Commands need to be re-issued if they have not been processed, for example, due to an error or resetting of the SATA drive. At step 532, a notification flag is set. Next, two steps are performed, one is step 534 and the other is step 536. At step 534, notification is sent to an initiator of an error and at step 536, the SATA drive is reset. It should be noted that, in an exemplary method of the present invention, resetting the SATA drive does not cause broadcasting the same (or this change) to the rest of the system. One way of effectuating broadcast is by a broadcast primitive.

After step 536, step 538 is performed wherein non-failing commands are re-sent to the SATA drive. After steps 534 and 538, a determination is made at 540 as to whether or not the steps 534 through 538 have been completed and if not, the process waits for completion thereof. If the determination yields a positive result, the process continues to step 542 wherein the notification flag that was set at step 532 is cleared or reset. The foregoing process re-issues commands that were for some reason not sent to the SATA drive thereby avoiding the need for initiators to re-send commands and/or lose commands thereby increasing system performance, efficiency and integrity.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention. It is obvious to an expert in the art to combine the present invention with prior art to develop devices and methods that perform multiple functions including the teachings of this invention. Such devices and methods fall within the scope of present invention.

What is claimed is:

1. A memory system comprising:
   at least two initiators, each initiator having associated therewith an initiator tag;
   a Serial Advanced Technology Attachment (SATA) device;
   an bridge device configured to facilitate communication between the at least one initiator and the SATA device and having at least one Serial Attached Small Computer System Interface (SCSI) (SAS) input port and operative to receive information through the at least one input port from the initiators, the bridge device for processing a notification event wherein notification is sent to the at least one initiators during a notification event, and for performing an action, based on a an event, thereby facilitating ease of communication,
the memory system further including reserved tags used for issuing commands to the SATA device, and associated with the at least one initiator and used by the at least one initiator to correlate received information with an incoming initiator command, the reserved tags being mapped and remapped and in this respect, dynamically assignable from the at least one initiators' tags based on in-coming initiator commands, one of the at least one initiators operable to,
   clear an initiator flag;
   receive notification;
   perform an action based on the received notification;
   request, through an Serial Management Protocol (SMP) connection, clear a notification flag associated with the received notification;
   determine whether clearance of the notification flag is accepted by the SATA device and if not, repeat the request through the SMP connection and the determine whether clearance of the notification flag is accepted until clearance of the notification flag is accepted.

2. A memory system, as recited in claim 1, wherein the at least one input port is at least one SAS input port.

3. A memory system, as recited in claim 1, further including a plurality of expanders coupled between the plurality of initiators and the bridge device.

4. A memory system, as recited in claim 3, wherein an expander includes an initiator.

5. A memory system, as recited in claim 1, wherein the at least one input port is at least one SATA input port.

6. A memory system, as recited in claim 1, wherein the bridge device is a multi-port SAS mux and SAS-to-SATA bridge device.

7. A memory system, as recited in claim 6, wherein the bridge device includes an affiliation table used for associating the plurality of initiators and SAS ports with their corresponding notification event, the notification event indicative of a condition wherein a corresponding initiator is prevented from accessing the improved bridge device.

8. A memory system, as recited in claim 7, further including a replacement initiator replacing one of the at least one initiator that has failed.

9. A memory system, as recited in claim 6, wherein the affiliation table has a depth associated therewith and the depth is limited to a predetermined depth.

10. A memory system, as recited in claim 6, further including a mailbox table including mailbox information including information passed between initiators.

11. A memory system, as recited in claim 10, further including an affiliation counter, for maintaining status of changes to the topology of the bridge device wherein mismatch of the values between the current value of the counter and a previous value thereof when it was read last time being indicative of a change in topology of the bridge device.

12. A memory system, as recited in claim 10, wherein the affiliation table includes SAS address for identifying initiators and being affiliated with one or more ports, and further wherein, affiliated SAS addresses are moved, atomically, to a new set of SAS addresses.

13. A memory system, as recited in claim 12, wherein the affiliation table is caused to be cleared as to a SAS address associated with an initiator that has exceeded a predetermined time by which to communicate with the bridge device.

14. A memory system, as recited in claim 13, further including one or more expanders wherein the bridge device includes an affiliation table used for associating the plurality of initiators and SAS ports with their corresponding notification event, the notification event indicative of a condition wherein a corresponding initiator is prevented from accessing the bridge device.

15. A memory system, as recited in claim 1, further including means for clearing affiliations associated with initiators to reclaim an assigned tag.

16. A memory system, as recited in claim 15, wherein an assigned reserved tags, reserved tags assigned to initiator tags, are in sequential order.

17. A memory system, as recited in claim 1, further including one or more expanders including an affiliation table used for associating the plurality of initiators and SAS ports with their corresponding notification event, the notification event indicative of a condition wherein a corresponding initiator is prevented from accessing the bridge device.

18. A memory system, as recited in claim 1, further including one or more expanders coupled to the bridge device wherein the initiator is interrupt driven with notification events causing an interrupt to the bridge device thereby avoiding querying an expander to find the location of the event.

19. A memory system, as recited in claim 1, further including one or more expanders coupled to the bridge device wherein the initiator is interrupt driven wherein upon the occurrence of a notification event an interrupt is caused to inform the bridge device of the notification event and further wherein no links are dropped as a result of the notification event.

20. A memory system, as recited in claim 1, further including one or more expanders coupled to the bridge device wherein the bridge device generates a notification frame or primitive to the initiator and the initiator uses this frame or primitive as an interrupt to itself.

21. A bridge device comprising:
at least two Statistical Analysis System (SAS) input ports for coupling the device to at least one initiator;
a Serial Advanced Technology Attachment (SATA) port for coupling the device to a disk drive; and
a bridge for converting the received information to SATA information for communication with the disk drive, the device causing communication between at least two of the plurality of initiators, the bridge device configured to facilitate communication between the at least one initiator and the disk drive and having at least two SAS input ports and coupled and operative to receive information through the input ports from the initiators, the multi-port bridge device for processing a notification event wherein notification is sent to the at least one initiator during a notification event, and for performing an action, based on a an event, thereby facilitating ease of communication, the at least one initiator operable to,
clear an initiator flag;
receive notification;
perform an action based on the received notification;
request, through an Serial Management Protocol (SMP) connection, clear a notification flag associated with the received notification;
determine whether clearance of the notification flag is accepted by the SATA device and
if not, repeat the request through the SMP connection and the determine whether clearance of the notification flag is accepted until clearance of the notification flag is accepted.

22. A bridge device, as recited in claim 21, wherein the device is a target.

23. A bridge device, as recited in claim 21, further including an affiliation table used for associating the plurality of initiators and SAS ports with their corresponding notification event, the notification event being indicative of a condition wherein a corresponding initiator is prevented from accessing the bridge device.

24. A bridge device, as recited in claim 21, further including a mailbox table including information passed between initiators.

25. A bridge device, as recited in claim 21, further including an affiliation counter for incrementing every time there is a change to the affiliation table.

26. A bridge device, as recited in claim 21 wherein event notification is noted by the bridge device by setting or resetting a notification flag during a notification state thereby preventing a corresponding initiator from accessing the bridge device.

27. A bridge device, as recited in claim 21 further including a notification table made of rows and columns with the columns indicative of the at least initiators and ports, the rows each representing the state of a specific port and a specific initiator, the table including 'Notification' flags, with the state of each flag being set or reset to indicate a problem/event with an initiator allowing preventing an initiator from accessing the bridge device.

28. A method of notifying one or more initiators of an event, by an bridge device configured to facilitate communication between the at least two initiators and a Serial Advanced Technology Attachment (SATA) device; and having at least one Serial Attached Small Computer System Interface (SCSI) (SAS) input port and operative to receive information through the at least one input port from the initiators, the bridge device for processing a notification event wherein notification is sent to the at least one initiators during a notification event, and for performing an action, based on a an event, thereby facilitating ease of communication, the method comprising:
The bridge device setting a notification flag;
the bridge device sending a notification to one or more initiators;
the bridge device performing an action based on an event;
the bridge device clearing the notification flag; and
Determine whether clearance of the notification flag is accepted by the SATA device and if not, repeat the request through an Serial Management Protocol (SMP) connection and determine whether clearance of the notification flag is accepted until clearance of the notification flag is accepted.

29. A method of notifying one or more initiators of an event, as recited in claim 28, wherein the notification event is an error event.

30. A method of notifying one or more initiators of an event, as recited in claim 28, wherein the notification event is a non-error event.

31. A method of notifying, as recited in claim 28, further including requesting an Signal Transfer Point (STP) or Serial Management Protocol (SMP) open.

32. A method of notifying, as recited in claim 28, further including determining whether or not the notification flag is set and if so, performing normal operation.

33. A method of notifying, as recited in claim 28, further including, upon determining that the notification flag is set, determining whether or not the notification is sent to an intended initiator and if so, issuing a STP retry.

34. A method of notifying, as recited in claim 33, further including upon determining that the notification flag is not set, determining whether or not notification is ready to be sent and if so, sending the notification and if not, issuing a STP retry.

35. A method of notifying, as recited in claim 34, further including clearing the notification flag.

36. A method of notifying, as recited in claim 35, further including cleaning up commands.

37. A method of notifying, as recited in claim 34, further including accepting clearing of flag.

* * * * *